Dec. 16, 1941.  G. M. KINGSLAND  2,266,217
AIR CONDITIONING SYSTEM
Filed June 12, 1940   2 Sheets-Sheet 1

Inventor
George M. Kingsland
By George H Fisher
Attorney

Dec. 16, 1941.　　　G. M. KINGSLAND　　　2,266,217
AIR CONDITIONING SYSTEM
Filed June 12, 1940　　　2 Sheets-Sheet 2
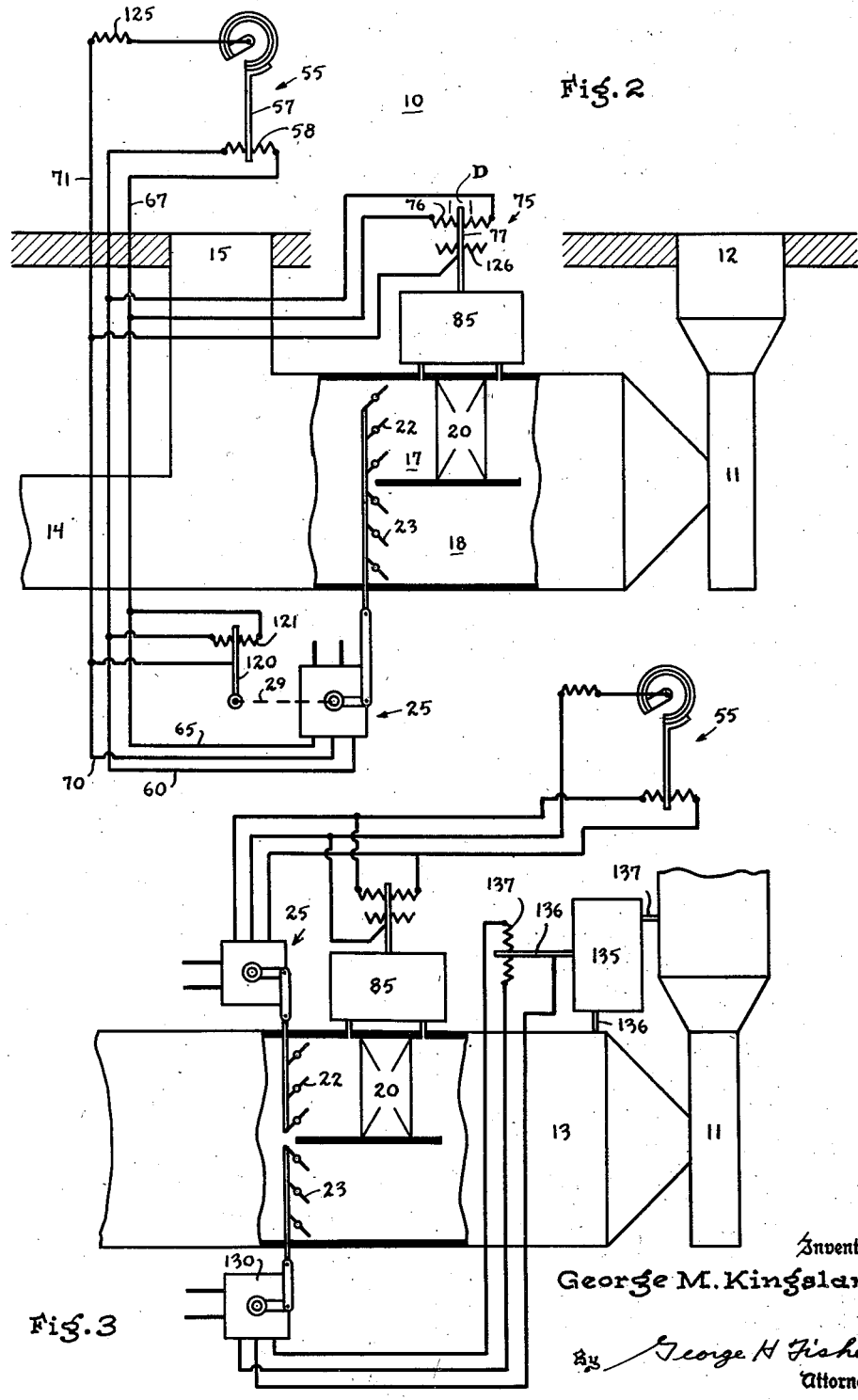
Inventor
George M. Kingsland
By George H. Fisher
Attorney Patented Dec. 16, 1941

2,266,217

UNITED STATES PATENT OFFICE 2,266,217

AIR CONDITIONING SYSTEM

George M. Kingsland, Philadelphia, Pa., assignor to Minneapolis-Honeywell Regulator Company, Minneapolis, Minn., a corporation of Delaware Application June 12, 1940, Serial No. 340,145

15 Claims. (Cl. 236—13)

This invention relates to air conditioning systems and more particularly to means for controlling the positions of dampers used in connection with air conditioning systems.

In the type of air conditioning system to which my invention is particularly applicable, it is common to provide an air conditioning chamber through which air is circulated and delivered to the space or spaces to be conditioned, the air conditioning chamber housing suitable conditioning means, which may be in the form of a heating or cooling coil, or suitable humidifying or dehumidifying means, depending upon what condition is to be controlled. There may be a suitable by-pass in the air conditioning chamber, and the condition of the space or spaces may be controlled by causing more or less of the air passing through the air conditioning chamber to contact with the air conditioning means. This control of the air flow is usually effected by providing face and by-pass dampers operated by a suitable motor or motors, either electric or pneumatic, whereby the dampers may be modulated and assume predetermined positions depending upon the particular condition existing in the space whose condition is to be controlled. With systems of this type, the extent of motor movement varies in accordance with the variation in the condition being controlled, so that the extent of damper movement will vary in the same relationship.

Systems of this type do not give a straight line modulation of air flow through and around the air conditioning means by reason of the inherent characteristics of conventional dampers. Thus, as the damper moves through a given distance when in nearly closed position, a much greater variation of air flow thereby takes place than when the damper moves through the same distance when nearly open. Accordingly, while dampers operated in this manner have given fairly satisfactory results, this inherent characteristic of the flow of air through the dampers has prevented entirely satisfactory and accurate control thereby. Any errors in correctly sizing and designing of the dampers will also increase any inaccuracies in properly controlling the air flow.

In accordance with the teachings of my invention, the dampers do not assume any definite position depending upon the condition of the space, but assume such a position that the flow of air through the conditioning means will bear a definite relationship with the condition in the space, thus securing straight line modulation of air flow through the conditioning means. I accomplish this result, according to the preferred form of my invention, by utilizing the pressure drop across the conditioning means to measure the air flow, by means of a differential pressure controller, and since variations in pressure drop give a direct indication of the flow therethrough, the damper operating means may be under the control of a device responsive to the pressure drop across the conditioning means as well as under the control of a device responsive to the condition of the space, so as to control the dampers in terms of pressure drop, which will be varied in accordance with variations in the condition being controlled, and in this manner, there will be a straight line relationship between the condition in the space and the air flow over the conditioning means, and any errors in the design or proper sizing of the dampers will in no way affect the accuracy of control of the air flow.

My invention also contemplates an individual control of the by-pass damper in accordance with the pressure differential over the circulating means whereby the total flow of air through the space is maintained constant at all times, regardless of the position of the face damper. In the conventional system, if the dampers are improperly designed, or if the movements of the face and by-pass dampers are not properly synchronized, there may be a considerable variation in the rate of air flow through the space which may further detract from the accuracy of control.

It is an object of the present invention to provide an improved operating system for controlling the positions of face and by-pass dampers with respect to an air conditioning means in such a manner as to secure straight line modulation of the air flow past the air conditioning means in accordance with variations in the condition being controlled.

It is a further object of my invention to provide, in a system of the kind described above, means for controlling the flow of air past an air conditioning means in a manner to secure straight line modulation of air flow in accordance with the condition being controlled, while insuring the maintenance of a constant flow of air to the space being conditioned, at all times, regardless of the amount of air flowing past the air conditioning means.

Other objects and advantages will become apparent upon a study of the specification, claims, and appended drawings wherein like reference characters represent like parts in the various views and wherein Figure 1 is a schematic illustration of one form of system embodying my invention;

Figure 2 represents a modification of the system shown in Figure 1, and

Figure 3 is a still further modification of the system embodying the principles of my invention.

Figure 1:
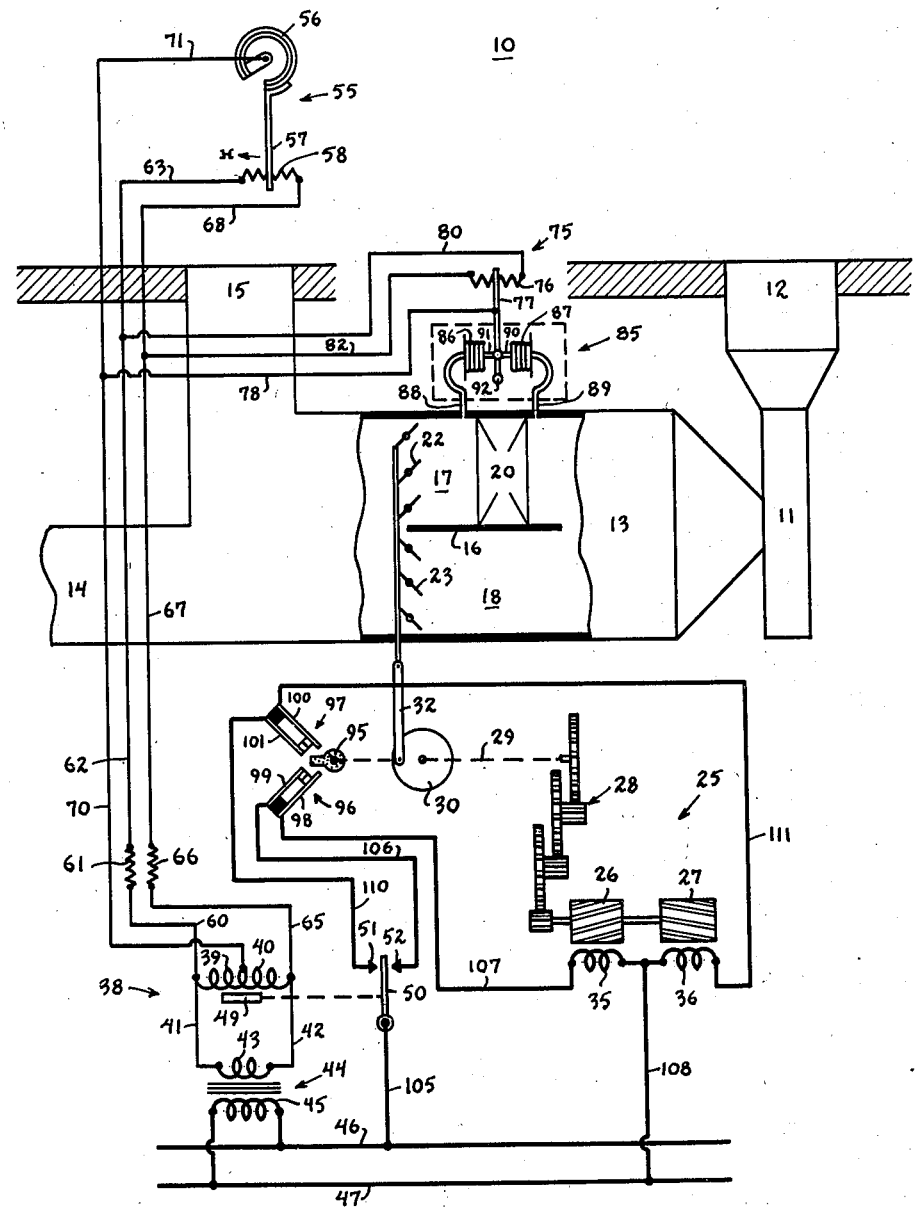

Referring more particularly to Figure 1, reference character 10 represents a space being conditioned, air being delivered to the space 10 by means of a suitably driven fan 11 discharging the air into the space by way of the opening 12. The inlet of the fan 11 communicates with an air conditioning chamber 13 having fresh and return air inlets 14 and 15, the relative proportions of air being delivered to the chamber 13 by way of these inlet openings being controlled by any suitable means such as dampers, not shown.

The chamber 13 is divided by a partition 16 into a conditioning passageway 17 and a by-pass 18, there being a suitable conditioning means 20 in the passageway 17 for conditioning the air flowing therethrough. This conditioning means may be of any suitable character such as a heating or cooling means, a dehumidifying coil, etc. but for purposes of description it will be referred to hereinafter as a heating coil and it should be understood that the presence of this coil 20 in the passageway 17 offers a restriction to the flow of air therethrough so that there will be a noticeable pressure drop therethrough. Face and by-pass dampers 22 and 23 control the relative volumes of air flowing through the conditioning passageway 17 and the by-pass 18 and these dampers may be suitably interconnected and driven by a single motor which is represented generally by the reference characterter 25.

The motor 25 is shown to comprise a pair of armatures 26 and 27 which may be suitably interconnected and connected by means of reduction gearing 28 to a shaft 29 carrying a crank 30 connected to the face and by-pass dampers by means of a crank arm 32. It will now be understood that rotation of the armatures 26 or 27 in one direction or the other will cause movement of the dampers in directions corresponding to the direction of rotation of the armatures and it will be apparent from the drawings that the face and by-pass dampers will move in opposite directions. In other words, as the face dampers 22 move towards open position by reason of clockwise rotation of the crank 30, the by-pass dampers 23 will be moved towards closed position and vice versa.

Field coils 35 and 36 cooperate with the armatures 26 and 27, energization of the coil 35 causing rotation of the armature 26 in a direction to move the face dampers 22 towards closed position whereas energization of the field winding 36 will cause rotation of armature 27 in the opposite direction to move the dampers 22 towards open position. The energization of the field windings 35 and 36 is controlled by a relay designated generally by the reference character 38 which relay is shown to comprise a pair of opposed balanced relay coils 39 and 40 connected together at one end and having their opposite ends connected by means of conductors 41 and 42 to the secondary 43 of a step-down transformer 44. This transformer also includes a high tension primary 45 connected across line wires 46 and 47 connected to a suitable source of power (not shown). The relay 38 also includes an armature 49 controlling the position of a switch arm 50 with respect to the contacts 51 and 52. When the coils 39 and 40 are equally energized the armature 49 and the switch arm 50 will assume the positions shown. If the relay coil 39 becomes more highly energized than the coil 40 the armature and switch arm will move to the left whereupon the switch arm will move into engagement with the contact 51. On the other hand, if the relay coil 40 is the more highly energized, the arm 50 will move into engagement with the contact 52.

The relative energizations of the two relay coils 39 and 40 are controlled by means of a thermostat 55 responding to the temperature of the space 10, which thermostat may be of any suitable construction and is shown to comprise a bimetallic element 56 controlling the position of an arm 57 with respect to a potentiometer resistance 58. The outer extremity of the relay coil 39 is connected by means of conductor 60, resistance 61, conductors 62 and 63 to the left end of the resistance 58 whereas the outer extremity of the relay coil 40 is connected by means of conductor 65, resistance 66 and conductors 67 and 68 to the opposite end of the resistance 58. The arm 57 of the thermostat 55 is connected by means of conductors 70 and 71 to the junction of the relay coils 39 and 40. With the parts in the positions illustrated, the coils 39 and 40 are equally energized but should the arm 57 move towards the left in response to an increase in temperature in the space, for example, the relay coil 39 will be partially shunted out and the coil 40 will be more highly energized so that switch arm 50 of the relay moves into engagement with the contact 52. On the other hand if the arm 57 moves towards the right in response to a drop in temperature in the space the relay coil 39 will become the more highly energized whereupon the switch arm 50 will be moved into engagement with the contact 51.

A second potentiometer 75 comprising a potentiometer resistance 76 and a control arm 77 is provided for causing rebalancing of the relay coils 39 and 40. The arm 77 is connected to the junction of the coils 39 and 40 by means of conductors 78 and 70, the right end of the resistance 76 is connected by means of conductors 80, 62, resistance 61, and conductor 60 to the left end of the coil 39 whereas the opposite end of the resistance 76 is connected by means of conductor 65, resistance 66, conductors 67 and 82 to the right end of the relay coil 40. Accordingly if the thermostat arm 57 moves towards the left thus causing relay coil 40 to become the more highly energized, movement of the arm 77 in the same direction will be necessary to cause rebalancing of the relay coils.

The position of the arm 77 with respect to the potentiometer resistance 76 is controlled by a differential pressure controller represented generally by the reference character 85 and which may comprise bellows 86 and 87 connected by means of tubes 88 and 89, respectively, to the high pressure and low pressure sides of the conditioning coil 20. Since the coil 20 offers a fixed resistance to the flow of air therethrough it will function in the same way as a fixed orifice so that the relative pressures in the bellows 86 and 87 will depend upon the rate of flow of air through the coil 20. The bellows 86 and 87 are suitably interconnected by means of member 90 which has a pivotal connection at 91 to the arm 77 which in turn may be pivoted to a fixed support as at 92. Accordingly the position of the arm 77 with respect to the potentiometer resistance 76 will depend upon the relative pressures in the bellows 86 and 87 or upon the pressures on the two sides of the coil 20 which corresponds to the rate of flow of air through the coil 20. The potentiometer arm 77 will therefore assume positions with respect to the resistance 76 which correspond directly to the rate of flow of air through the conditioning coil and upon an increase in the rate of flow the pressure differential will increase thus causing movement of arm 77 toward the right whereas upon a decrease in the rate of flow the pressure differential will decrease whereupon the arm 77 will move toward the left. It will thus be seen that as the temperature in the space increases, the arm 77 must move towards the left in order to cause a rebalancing of the relay coils 39 and 40 which result will take place only upon a decrease in flow of air through the coil 20. It is assumed for purposes of description that the coil 20 is a heating coil, the system being used as a heating system and it should be further understood that the same system is applicable for use as a cooling system by properly reversing the electrical connections.

Referring again to the motor 25, it will be noted that the shaft 29 carries a cam element 95 which moves between a pair of switches 96 and 97. The switch 96 comprises cooperating switch arms 98 and 99 whereas the switch 97 comprises switch arms 100 and 101, the switch arms of the two switches being normally biased together. Should the cam 95 rotate far enough in one direction or the other it will engage the projecting portion of the switch arm 98 or 100 thus moving the switch arm away from the cooperating switch arm for a purpose to be pointed out.

Assume now that the temperature in the space has risen above the desired value and arm 57 of the thermostat moves towards the left thus causing relay coil 40 to become the more highly energized whereupon the switch arm 50 moves into engagement with the contact 52. A circuit is now established through the field winding 35 of motor 25 as follows: from line wire 46 through conductor 105, switch arm 50, contact 52, conductor 106, switch arms 99 and 98, conductor 107, field winding 35, and conductor 108 to the line wire 47. Energization of the field winding 35 causes rotation of armature 26 in a direction to move the crank 30 in a counter-clockwise direction thus moving the face dampers 22 towards closed position and the by-pass dampers 23 towards open position so that the flow of air over the heating coil will be decreased. As the flow of air decreases, the pressure differential across the coil 20 will likewise decrease and arm 77 will move towards the left and after the pressure differential has decreased sufficiently so that the relay coils 39 and 40 are again equally energized, the arm 50 of the relay will move out of engagement with the contact 52 thus stopping rotation of the motor 25. Should the flow of air over the coil 20 vary for any reason after the motor has stopped, this will be sensed by a variation in the pressure differential and the control arm 77 of the potentiometer 75 will thereupon unbalance the relay coils 39 and 40 until the dampers 22 have moved to cause the air flow to be at the desired value. Thus for any temperature in the space 10 there will be a definite air flow through the coil 20 and the flow of air will vary in a straight line relationship as the temperature in the space departs from a desired value regardless of the size or design of the dampers 22.

If the temperature in the space should decrease indicating that more heat is required in the space, movement of the arm 57 of the thermostat towards the right will cause the relay coil 39 to become more highly energized than the coil 40 whereupon relay arm 50 moves into engagement with contact 51 thus establishing a circuit through the field winding 36 of motor 25 as follows: from the line wire 46 through conductor 105, switch arm 50, contact 51, conductor 110, switch arms 101 and 100, conductor 111, field winding 36 and conductor 108 to the line wire 47. The motor 25 will now operate to open the dampers 22 until the pressure differential across the coil 20 has increased sufficiently so that movement of arm 77 of the potentiometer 75 to the right has caused a rebalancing of the relay coils.

The resistances 61 and 66 in the connections to the relay coils 39 and 40 serve as protective resistances to prevent a short circuit from ever occurring across the transformer 44 regardless of any positions that the various controllers may assume. The switches 96 and 97 in the circuits to the field windings 35 and 36 serve as limit switches to interrupt the circuit to the motor after the shaft 29 has been rotated thereby through a predetermined amount.

It will now be seen that with the system illustrated in Figure 1, the dampers 22 are not controlled directly by the thermostat 55 but are controlled by the thermostat and the differential pressure controller 85 so that there will be a definite rate of flow of air through the conditioning coil 20 for any temperature in the space, so that a straight line modulation may be secured and the fact that a given movement of the dampers 22 when they are in nearly closed position will cause a greater change in the rate of flow than the same movement of the dampers when in their nearly wide open position will have no effect on the amount of air that is allowed to flow past the coil 20 since there is not a straight line relationship between the movement of the dampers and the temperature of the space. There is however a straight line relationship between the temperature of the space and the amount of air that flows over the coil 20 and in this manner the temperature of the space may be more accurately controlled than in the conventional system wherein the damper operating motor is controlled solely by space temperature and does not give a straight line modulation of air flow over the conditioning means. The inherent pressure drop through the coil 20 is made use of by connecting the two bellows constituting the differential pressure controller on opposite sides of the coil so that the rate of flow to the coil may be measured by the use of a minimum number of parts.

Referring now to Figure 2, the motor 25 is shown only schematically but it will be understood that this motor includes armatures 26 and 27, the relay 38, limit switches 97 and 98 all as shown in Figure 1. It will also be understood that the conductors 60 and 65 are connected to the extremities of the relay coils and the conductor 70 connects to the adjoining parts of the relay coils in the manner shown in detail in Figure 1. The shaft 29 driven by the motor 25 in this figure also carries an arm 120 which cooperates with a potentiometer resistance 121 and acts as the balancing potentiometer for the relay coils instead of the potentiometer 75 controlled by the pressure differential across the conditioning coil 20. The potentiometer 75 in this figure acts as the main controller for the relay 38 of Figure 1 and accordingly for the motor 25 and the control point of this control potentiometer is adjusted by the thermostat 55 responding to the temperature of the space 10. A resistance 125 which may be in the form of an adjustable resistance desensitizes the effect of the thermostat 55 on the motor 25 so that the controller 75 will act as the main controller for the motor. If the temperature in the space does not fluctuate but if the flow of air over the coil 20 should for any reason fluctuate the arm 77 of the differential pressure controller 85 will move with respect to the resistance 76 which as will be understood upon reference to Figure 1 will cause operation of the motor 25 in a direction to move the dampers so as to increase or decrease the flow of air over the coil 20 according to the particular circumstances. When the flow of air over the coil 20 is being changed to the desired value the arm 120 driven by the shaft 29 will move with respect to the potentiometer resistance 121 which is connected in parallel with the relay coils until the relay coils are again properly balanced.

Should there be a change in temperature in the space as, for example, a decrease in temperature, the arm 57 of the thermostat will move towards the right over the resistance 58 which will have the effect of shifting the control point of the arm 77 towards the right so as to increase the pressure differential across the coil 20 and accordingly to increase the flow of air thereover. The presence of the resistance 125 in the circuit to the thermostat 55 desensitizes this controller, as mentioned previously, so that a movement of the arm 77 through a distance D will have the same effect on the motor 25 as a movement of the arm 57 throughout the entire range of the resistance 58. Accordingly the arm 77 forms the main controller and the control range D thereof is shifted in accordance with variations in temperature in the space 10. The balancing of the relay coils is accomplished by a potentiometer controlled directly by the motor 25 instead of a differential pressure controller as in Figure 1 but it should be understood that the result obtained by the two systems is substantially the same and further description thereof appears to be unnecessary.

A center tapped resistance 126 is provided in the circuit to the control arm 77, the arm being arranged to move over this resistance in response to variations in pressure differential, so that the operating range of this arm will be the same length regardless of the position thereof as determined by the thermostat 55.

Referring now to Figure 3 it will be seen that the face and by-pass dampers 22 and 23 are not interconnected as in Figures 1 and 2 but the face dampers only are controlled by the motor 25 whereas the by-pass dampers 23 are controlled by a motor 130 which may be identical in construction with the motor 25.

The motor 25 for operating the face dampers 22 may be operated either as shown in Figures 1 and 2. In other words the rebalancing of the relay coils controlling operation of the motor may be effected either by the differential pressure controller 85 of Figure 1 or by means of potentiometer driven by the motor as in Figure 2 in which case the differential pressure controller acts as the main control element, the control point thereof being adjusted by means of the thermostat 55.

The by-pass dampers 23 are controlled in this modification in such a manner as to maintain the total flow of air through the air conditioning chamber 13 and the space being conditioned substantially constant at all times regardless of the amount of air that flows through the conditioning coil 20. For this purpose a differential pressure controller represented generally by the reference character 135 and which may be similar in construction to the differential pressure controller 85 has connections to the inlet and outlet of the fan 11 by means of the pipes 136 and 137. Should there be a decrease in the total flow of air through the chamber 13 this would be reflected by a decrease in the pressure differential at the inlet and outlet of the fan whereupon the control arm 136 would move with respect to the potentiometer resistance 137 to operate the motor 130 so as to move the dampers 23 to such a position that the flow of air through the chamber 13 will rise to the proper value. Where the dampers are interconnected as in Figures 1 and 2 the total flow of air through the air conditioning chamber will generally fluctuate to some extent by reason of the restriction in the passageway 17 so that varying amounts of air will be delivered to the space depending upon the temperature therein. However with the system of Figure 3, since the by-pass dampers 23 are independently operated under the control of the differential pressure controller 135, a substantially constant flow of air through the air conditioning chamber 13 and the space or spaces being conditioned is assured at all times while at the same time the flow of air over the conditioner 20 is varied in a straight line relationship with respect to the departure of the condition of the air in the space from the desired value.

Having described some preferred embodiments of my invention many modifications may become apparent to those skilled in the art, for example, the differential pressure controllers may assume any desired construction and the dampers may be pneumatically operated instead of electrically operated. It should therefore be understood that my invention is limited only by the scope of the appended claims.

I claim as my invention:

1. In an air conditioning system, an air conditioning chamber, means for causing a circulation of air through said chamber and through a space to be conditioned, air conditioning means in said chamber for changing the condition of the air passing therethrough, regulating means for regulating the rate of flow of air passing through said chamber in contact with said conditioning means, means responsive to the pressure drop in said air across said conditioning means in control of said regulating means, and means responsive to a condition of the air in said space for adjusting the control point of said pressure responsive means.

2. In an air conditioning system, an air conditioning chamber, means for causing a circulation of air through said chamber and through a space to be conditioned, air conditioning means in said chamber for changing the condition of the air passing therethrough, said air conditioning means being so arranged as to restrict the flow of air therethrough, damper means controlling the flow of air through said conditioning means, means responsive to the difference in pressures in said air between the inlet and outlet of said conditioning means in control of said damper means to maintain a constant flow of air therethrough, and means responsive to a condition of the air in said space for adjusting the control point of said pressure responsive means.

3. In an air conditioning system, an air conditioning chamber, means for causing a circulation of air through said chamber and through a space to be conditioned, air conditioning means in said chamber for changing the condition of the air passing therethrough, said air conditioning means being so arranged as to restrict the flow of air therethrough, damper means controlling the flow of air through said conditioning means, means responsive to the difference in pressures in said air between the inlet and outlet of said conditioning means in control of said damper means to maintain a constant flow of air therethrough, means responsive to a condition of the air in said space for adjusting the control point of said pressure responsive means, said air conditioning chamber being arranged to permit the air flowing therethrough to by-pass the air conditioning means, damper means controlling the flow of air through said by-pass, and means controlling said last named damper means to maintain a constant flow of air through said air conditioning chamber and into said space at all times.

4. In an air conditioning system, an air conditioning chamber, means for causing a circulation of air through said chamber and through a space to be conditioned, air conditioning means in said chamber for changing the condition of the air passing therethrough, said air conditioning means being so arranged as to restrict the flow of air therethrough, damper means controlling the flow of air through said conditioning means, means responsive to the difference in pressures in said air between the inlet and outlet of said conditioning means in control of said damper means to maintain a constant flow of air therethrough, means responsive to a condition of the air in said space for adjusting the control point of said pressure responsive means, said air conditioning chamber being arranged to permit the air flowing therethrough to by-pass the air conditioning means, damper means controlling the flow of air through said by-pass, and means responsive to the pressure differential across said air circulating means for controlling said last named damper means to maintain a constant flow of air through said chamber and into said space at all times.

5. In an air conditioning system, an air conditioning chamber, means for causing a circulation of air through said chamber and through a space to be conditioned, air conditioning means in said chamber for changing the condition of the air passing therethrough, regulating means for regulating the rate of flow of air passing through said chamber in contact with said conditioning means, means responsive to the flow of air through said air conditioning means in control of said regulating means, means responsive to a condition of the air in said space for adjusting the control point of said flow responsive means, second flow regulating means for controlling flow of air by said circulating means into said space without contacting with said conditioning means, and means responsive to the difference in pressures between the low pressure side and the high pressure side of said circulating means in control of said second flow regulating means to maintain a constant flow of air into said space at all times.

6. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, means responsive to the pressure drop in said air across said coil in control of said face damper, and means responsive to the temperature of said space for adjusting the control point of said pressure responsive means whereby the flow of air through said coil will vary in a straight line relationship with variations in temperature from a predetermined value.

7. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, means responsive to the pressure drop in said air across said coil in control of said face damper, means responsive to the temperature of said space for adjusting the control point of said pressure responsive means whereby the flow of air through said coil will vary in a straight line relationship with variations in temperature from a predetermined value, and means for causing said by-pass damper to move inversely with respect to said face damper so that the total flow of air to said space will remain substantially constant.

8. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, means responsive to the pressure drop in said air across said coil in control of said face damper, means responsive to the temperature of said space for adjusting the control point of said pressure responsive means whereby the flow of air through said coil will vary in a straight line relationship with variations in temperature from a predetermined value, and means responsive to the difference in pressures on the intake and exhaust side of said air circulating means in control of said by-pass damper to maintain a substantially constant flow of air through said chamber and said space at all times.

9. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, a motor for controlling the positions of said face and by-pass dampers, said dampers being arranged to move in opposite directions, control means for said motor including means responsive to the drop in pressure in said air across said coil and means responsive to the temperature of the air in said space whereby the amount of air flowing through said coil will vary in a straight line relationship with respect to variations in temperature from a predetermined value.

10. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, a motor for controlling the position of said face damper, a second motor for controlling the position of said by-pass damper, means responsive to the rate of flow of air through said coil and to the temperature of said space for controlling said first motor so that the rate of flow through said coil varies in a straight line relationship with variations in temperature from a predetermined value, and means responsive to the difference in pressures between the low pressure and high pressure sides of said air circulating means in control of said second motor to maintain the total flow of air through said chamber and said space at a substantially constant value at all times.

11. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, face and by-pass dampers controlling the flow of air through and around said coil, a motor for controlling the position of said face damper, a second motor for controlling the position of said by-pass damper, means responsive to the pressure in said air drop across said coil for controlling said first motor, means responsive to the temperature of the space also in control of said first motor, said motor controlling means cooperating to vary the flow of air through said coil in a straight line relationship with respect to variations in temperature from a predetermined value, and means for controlling said second motor to adjust said by-pass damper to maintain the total flow of air through said chamber and through the space being conditioned constant at all times.

12. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, damper means controlling the flow of air through said coil, an electric reversible motor for controlling the position of said damper means, a relay having a pair of opposed normally balanced relay coils controlling operation of said motor, a control potentiometer for causing unbalancing of said relay coils and causing rotation of said motor in one direction or the other, means responsive to the temperature of the space in control of said potentiometer, a second potentiometer, and means responsive to the pressure drop in said air across said heat exchanger coil in control of said second potentiometer.

13. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, damper means controlling the flow of air through said coil, an electric reversible motor for controlling the position of said damper means, a relay having a pair of opposed normally balanced relay coils controlling operation of said motor, a control potentiometer for causing unbalancing of said relay coils and causing rotation of said motor in one direction or the other, means responsive to the pressure drop in said air across said heat exchanger coil in control of said potentiometer, means responsive to the temperature of the space for adjusting the control point of said potentiometer, a balancing potentiometer for causing rebalancing of said relay coils, and operative connections between said motor and said balancing potentiometer whereby operation of the motor to vary the air flow across the heat exchanger coil causes rebalancing of said relay coils.

14. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, damper means controlling the flow of air through said coil, an electric reversible motor for controlling the position of said damper means, a relay having a pair of opposed normally balanced relay coils controlling operation of said motor, a control potentiometer for causing unbalancing of said relay coils and causing rotation of said motor in one direction or the other, means responsive to the temperature of the space in control of said potentiometer, a second potentiometer, means responsive to the pressure drop in said air across said heat exchanger coil in control of said second potentiometer, damper means controlling the total flow of air through said conditioning chamber and said space, and means controlling said last named damper means to maintain the total flow of air substantially constant at all times.

15. In an air conditioning system, an air conditioning chamber, means for causing a circulation of air through said chamber and through a space to be conditioned, a heat exchanger coil in said chamber for controlling the temperature of the air passing therethrough, said heat exchanger coil offering a resistance to the flow of air therethrough, damper means controlling the flow of air through said coil, an electric reversible motor for controlling the position of said damper means, a relay having a pair of opposed normally balanced relay coils controlling operation of said motor, a control potentiometer for causing unbalancing of said relay coils and causing rotation of said motor in one direction or the other, means responsive to the pressure drop in said air across said heat exchanger coil in control of said potentiometer, means responsive to the temperature of the space for adjusting the control point of said potentiometer, a balancing potentiometer for causing rebalancing of said relay coils, operative connections between said motor and said balancing potentiometer whereby operation of the motor to vary the air flow across the heat exchanger coil causes rebalancing of said relay coils, damper means controlling the total flow of air through said conditioning chamber and said space, and means controlling said last named damper means to maintain the total flow of air substantially constant at all times.

GEORGE M. KINGSLAND.

CERTIFICATE OF CORRECTION.

Patent No. 2,266,217. December 16, 1941.

GEORGE M. KINGSLAND.

It is hereby certified that error appears in the printed specification of the above numbered patent requiring correction as follows: Page 6, first column, line 32, claim 11, for "pressure in said air drop" read --pressure drop in said air--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.